United States Patent [19]

Smith, II

[11] Patent Number: 4,622,607
[45] Date of Patent: Nov. 11, 1986

[54] INFORMATION STORAGE AND RETRIEVAL SYSTEM INCLUDING AN INFORMATION CONTAINING CARTRIDGE HAVING A SLIDABLE COVER

[76] Inventor: Kobert R. Smith, II, 23230 Ravensbury Ave., Los Altos Hills, Calif. 94022

[21] Appl. No.: 455,474

[22] Filed: Jan. 4, 1983

[51] Int. Cl.⁴ .................... G11B 5/012; G11B 23/03
[52] U.S. Cl. ...................................... 360/97; 360/133
[58] Field of Search ................... 360/132, 133, 97, 99, 360/86; 220/337; 206/387, 444, 312; 242/197, 199

[56] References Cited

U.S. PATENT DOCUMENTS

| 2,867,389 | 1/1959 | Viets | 242/55.11 |
| 3,815,971 | 6/1974 | Land | 352/130 |
| 3,900,170 | 8/1975 | Serizawa | 242/198 |
| 4,399,480 | 8/1983 | Edwards | 360/132 |
| 4,443,874 | 4/1984 | Steenberg | 369/291 |
| 4,445,157 | 4/1984 | Takahashi | 360/133 |
| 4,503,474 | 3/1985 | Nigam | 360/133 |
| 4,546,397 | 10/1985 | Asami et al. | 360/99 |
| 4,550,354 | 10/1985 | Wakabayashi et al. | 360/133 |

FOREIGN PATENT DOCUMENTS 58-102361 6/1983 Japan ...................... 360/133

Primary Examiner—Stuart N. Hecker
Assistant Examiner—Benjamin E. Urcia
Attorney, Agent, or Firm—Flehr, Hohbach, Test, Albritton & Herbert

[57] ABSTRACT

An information storage and retrieval system including an information containing cartridge and an apparatus for retrieving information therefrom is disclosed herein. The cartridge contains its information within a housing having an opening for gaining access to the information stored therein by the retrieval apparatus. At the same time, the cartridge housing carries a cover movable between a first position for covering the opening in order to protect its interior from dust and other elements in the ambient surroundings and a second position for uncovering the opening in order to gain access to the information stored within the cartridge.

5 Claims, 5 Drawing Figures

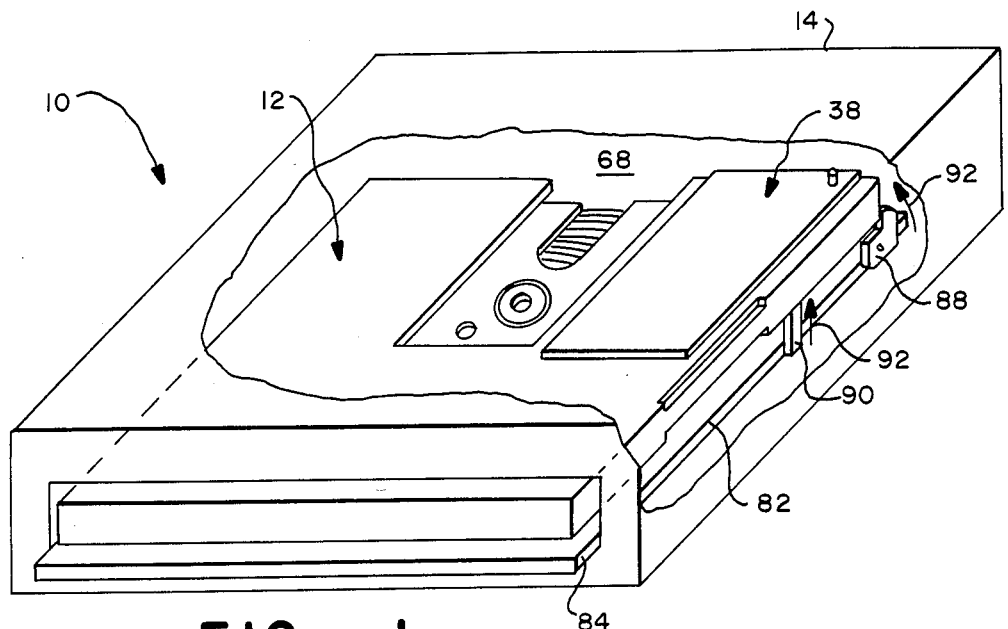
FIG.—1
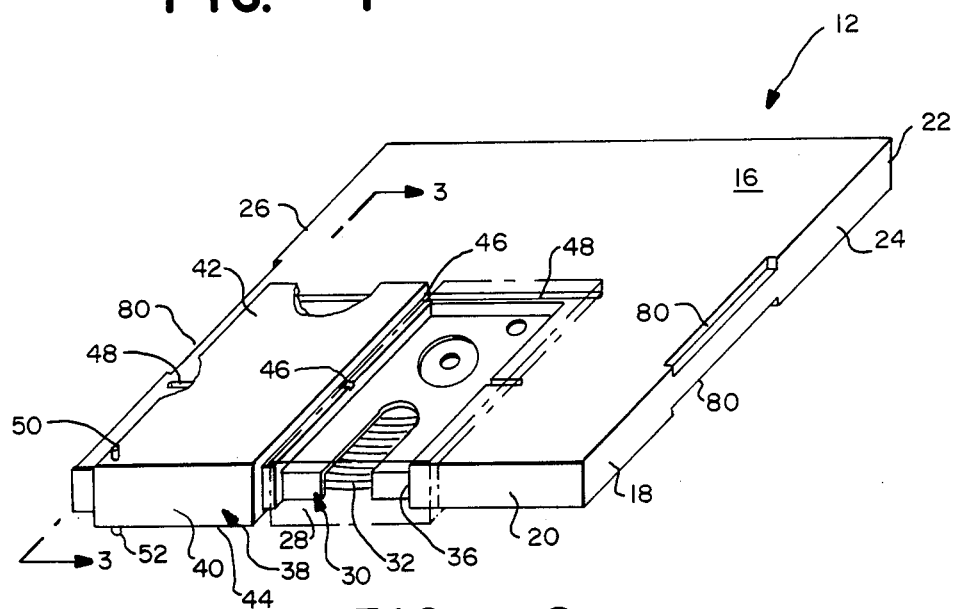
FIG.—2
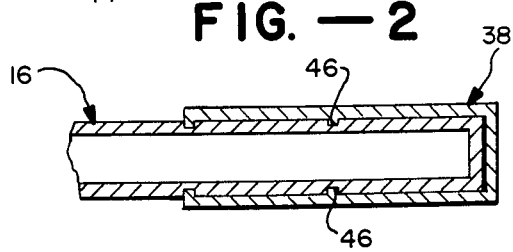
FIG.—3

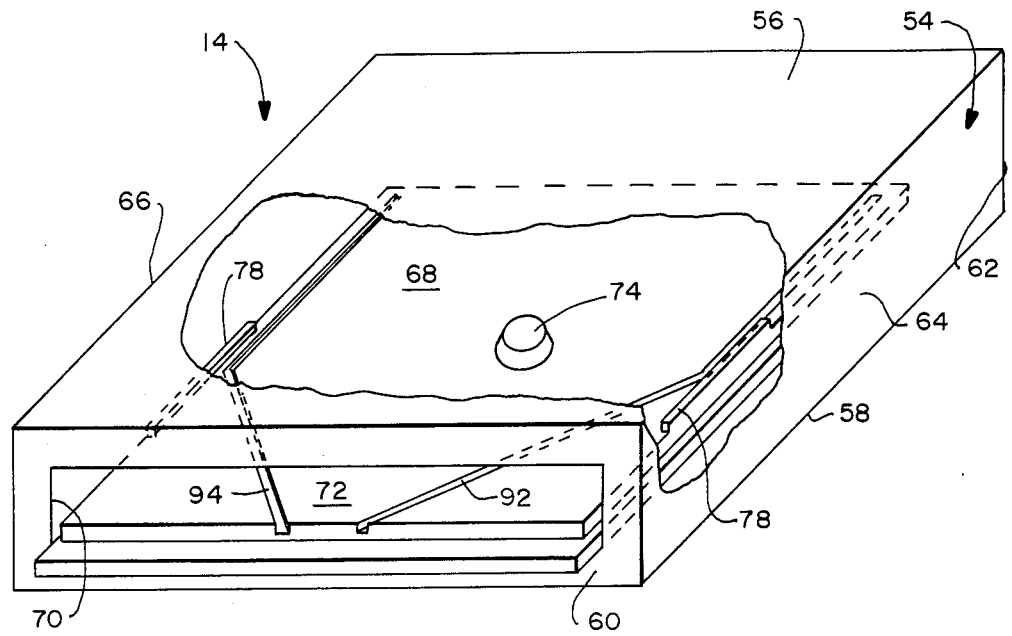
FIG.—4
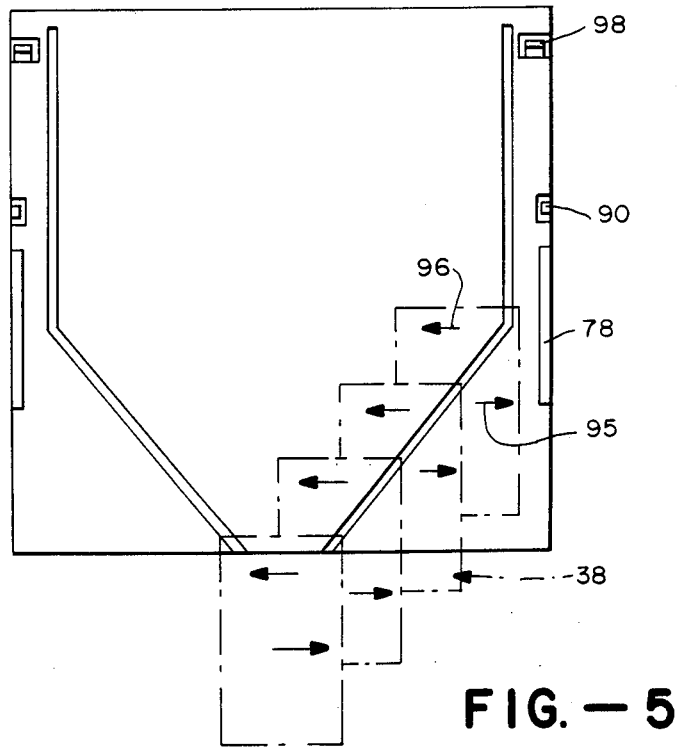
FIG.—5

INFORMATION STORAGE AND RETRIEVAL SYSTEM INCLUDING AN INFORMATION CONTAINING CARTRIDGE HAVING A SLIDABLE COVER

The present invention relates generally to information storage and retrieval systems of the general type which utilize information containing cartridges and more particularly to a technique for protecting the information storage mechanisms within such cartridges from dust and other elements in the ambient surroundings when the cartridges are not in use.

There are presently many different types of information storage and retrieval systems which utilize information containing cartridges or cassettes. For example, dictating equipment using magnetic tape in cassettes falls within this category as does video cassette recording equipment. More is recently, there has been a desire to place information on magnetic tape and even discs contained within a cassette or cartridge. For purposes herein, the term cartridge will be used in reference to either a cartridge or a cassette.

The typical cartridge utilizes specific means including for example magnetic tape, a disc or possibly other mechanisms for storing retrievable information in a particular mode and a cartridge housing. The latter has an inner compartment which contains the information storage means and also an opening into the compartment for gaining access to the storage means by cooperating information retrieving apparatus, for example the previously mentioned dictating machine, video cassette recorder or the like. While information containing cartridges presently available are quite convenient and generally satisfactory in use, applicant has found one particular failing in its design. Specifically, in each of the cartridges presently available its housing contains an opening for gaining access to its information storage mechanism contained therein by a cooperating information retrieving apparatus. This opening is present whether or not the cartridge is in use. As a result, the information storage mechanism is always exposed to the dust and other elements in the ambient surroundings.

In view of the foregoing, it is a primary object of the present invention to eliminate the disadvantage just recited in an uncomplicated and yet reliable fashion.

A more specific object of the present invention is to provide an information storage and retrieval system utilizing a cartridge containing an information storage mechanism which is made accessible to a cooperating information retrieving apparatus during use but which is protected from the ambient surroundings when not in use.

As will be discussed in more detail hereinafter, the cartridge disclosed herein is one which includes means including, for example, a magnetic disc for storing certain information in a particular mode, for example magnetically and a cartridge housing. The housing has an inner compartment including the information storing means and an opening into the compartment for gaining access to the storing means by cooperating information retrieving apparatus. In accordance with the present invention, the cartridge also includes cover means connected with the housing for movement between a first position for covering the opening in order to protect the information storing means from dust and other elements in the ambient surroundings and a second position for uncovering the opening and thereby allowing the cooperating information retrieving apparatus to gain access to the storing means. In a preferred embodiment of the present invention, the cartridge disclosed herein and its information retrieving apparatus include cooperating means for automatically uncovering the cartridge opening when the cartridge and apparatus are combined in the intended manner and for automatically closing the opening when the cartridge is separated from the apparatus in the intended manner.

The overall information storage and retrieval system disclosed herein will be described in more detail hereinafter in conjunction with the drawings wherein:

FIG. 1 is a perspective view of the overall information storage and retrieval system designed in accordance with the present invention;

FIG. 2 is a perspective view of an information containing cartridge forming part of the system illustrated in FIG. 1;

FIG. 3 is a sectional view of the cartridge illustrated in FIG. 2, taken generally along line 3—3 in FIG. 2;

FIG. 4 is a partially broken away perspective view of an information retrieving apparatus forming part of the overall system illustrated in FIG. 1; and FIG. 5 diagrammatically illustrates how the cartridge of FIG. 2 is combined with and separated from the apparatus of FIG. 4 in accordance with the present invention.

Turning now to the drawings, wherein like components are designated by like reference numerals through the various figures, attention is first directed to FIG. 1. This figure illustrates an overall information storage and retrieval system generally designated by the reference numeral 10. System 10 includes a cartridge generally indicated at 12 for storing information and an apparatus or "player" 14 for retrieving the information stored by cartridge 12. As will be discussed in more detail hereinafter, the cartridge 12 is a separate entity from player 14 as illustrated in FIG. 2. By placing the cartridge into its loaded position within player 14 its information is automatically made available to the player. On the other hand, when the cartridge is removed from player 14, its internal information and specifically the mechanism containing that information is automatically protected from the ambient surroundings.

Referring specifically to FIGS. 2 and 3, cartridge 12 is illustrated apart from player 14, as stated above. This cartridge includes an outermost generally rectangular housing 15 having a top side 16 and opposite bottom side 18 which are joined together by opposing front and back walls 20, 22 and opposing side walls 24, 26. The housing defines an inner compartment 28 which contains an information storage mechanism generally indicated at 30. In the particular embodiment illustrated, mechanism 30 includes a magnetic disc 32 and suitable support components including for example a center drive arrangement 34 for placing the disc in communication with player 14 in order to retrieve the information stored thereon when the cartridge is loaded into the player as illustrated in FIG. 1.

In order for player 14 to gain access to information storage mechanism 30, cartridge housing 15 includes an opening 36 which extends along a central section of front wall 20 and rearwardly therefrom along adjacent sections of top and bottom sides 16 and 18. In accordance with the present invention, cartridge 12 includes means for covering opening 36 when the cassette is not in use and for uncovering the opening when it is in use, specifically in its loaded position within player 14. In the particular embodiment illustrated, a generally U-shaped cover 38 serves as the covering means. This cover includes a front segment 40 and rearwardly extending top and bottom back segments 42 and 44 respectively disposed in confronting relationship with sections of front wall 20 and top and bottom sides 16 and 18 of housing 15. The cover is interconnected with the housing by cooperating ribs and grooves 46, 48 for movement along the cartridge body between the solid and dotted line positions illustrated in FIG. 2.

With cover 36 in its solid line position, it is located to one side of opening 36 in order to uncover the latter and thereby allow player 14 to gain access to information storage mechanism 30. When the cover is moved to its dotted line position, it completely covers opening 36 in order to protect mechanism 30 from dust and other elements in the ambient surroundings. As illustrated in both FIGS. 2 and 3, cover 42 includes a pair of pin members 50 and 52 fixedly connected to and extending out from cover segments 42 and 44, respectively. As will be seen hereinafter, these pin members or guide pins cooperate with certain components forming part of player 14 so that cover 42 is automatically moved from its dotted line position to its solid line position for exposing opening 36 as the cartridge is loaded into player 14 and is automatically moved back to its dotted line position for covering the opening as the cartridge is removed from the player.

Referring to FIGS. 4 and 5 in conjunction with FIG. 1, attention is now directed to player 14 which is shown including a main housing 54 having horizontally extending top and bottom sides 56 and 58 joined by vertically extending front and back walls 60, 62 and side walls 64, 66. The housing includes an inner chamber 68 and a generally rectangular opening 70 into the chamber from its front wall 60. While not shown, player 14 includes the necessary and readily providable components for retrieving information stored on disc 32 of cartridge 12 when the latter is loaded into chamber 68 in the intended manner.

Player 14 is shown specifically including a horizontally extending base plate 72 located within and at the bottom of chamber 68 for receiving cartridge 12 and supporting it in its loaded (operating) position within chamber 68. In the particular embodiment illustrated, the magnetic disc 32 forming part of cartridge 12 is driven by a cooperating drive head 74 forming part of player 14 and projecting upward from base plate 72. As the cartridge is initially inserted into chamber 68 through opening 70, it is guided over drive head 74 by cooperating, upstanding shoulders 78 on either side of the base plate. At the same time, cartridge housing 15 includes location notches 80 along its top side corners (those joining top side 16 with side walls 24 and 26) and along the bottom side corners (those joining the under side 18 with the same side walls), as best illustrated in FIG. 2. These notches are designed to receive previously recited shoulders 78. In this way, as the cartridge is inserted into chamber 68, when the bottom notches line up with the shoulders, the entire cartridge drops downward. This, in turn, causes drive mechanism 74 to engage with previously recited mechanism 34 forming part of the cartridge in order to drive the latter in the intended manner. Notches 80 are provided on both sides of cartridge housing 15 so that the cartridge can be placed in an operating position within chamber 68 on either side.

Inasmuch as cartridge 12 drops downward into its operating position within chamber 68, it is necessary to initially raise the cartridge in order to remove it from the chamber. To this end, player 14 includes an eject plate 82 disposed under base plate 72 within chamber 68 and extending partially outside opening 70 so as to provide a readily accessible eject handle 84. The eject plate supports a pair of rearwardmost pivot arms 88 and additional pivot arms 90 located slightly closer to opening 70. The eject plate 82 and its associated arms 88, 90 are designed such that downward flexing of handle 84 causes the arms to pivot upward in the direction of arrows 92 in FIG. 1. Otherwise the arms are biased in substantially horizontal positions. The arms 90 are located within chamber 68 directly under cartridge 12 when the latter is in its operating position and the arms 88 are located directly behind the cartridge. In this way, when handle 84 is flexed downward, the arms 90 push upward on the cartridge so as to raise notches 80 out of their respective shoulders 82. At the same time, arms 88 push the cartridge a slight distance outward through opening 70 so that the cartridge can be manually pulled out of chamber 68.

As stated previously, it is desirable to automatically uncover and cover opening 36 in cartridge 12 as the latter is loaded into player 14 and unloaded therefrom. To this end, base plate 72 includes a pair of grooves 92 and 94 which extend from centrally located points along opening 70 outwardly and then parallel to side walls 64 and 66, as best seen in FIG. 5. As will be seen below, these grooves cooperate with the previously recited guide pins 50 and 52 for automatically uncovering and covering opening 36.

Referring specifically to FIG. 5, attention is now directed to the way in which the guide pins 50 and 52 cooperate with grooves 92 and 94 for automatically moving cover 38 forming part of the cartridge 12 between its solid and dotted lined positions shown in FIG. 2. Assume first that the cover is in its dotted line position for closing opening 36 and that the cartridge is to be inserted into chamber 68 with pin 52 extending downward. Under these circumstances, as the cartridge is inserted into opening 70, guide pin 52 is confined to groove 92 which serves as a guide track. This causes cover 36 to move to the right as viewed in FIG. 5 and indicated by arrows 95 until it reaches its solid line position. As a result, the opening 36 is uncovered by the time the cartridge reaches it operating position. As the cartridge is removed from chamber 68, the cover is caused to move to its left as viewed in FIG. 5 and as indicated by arrows 96 until the cover completely closes opening 36. The groove 94 in cooperation with pin 50 serves the same purpose when the cartridge is inserted into and removed from chamber 68 on its opposite side.

While a specific technique for automatically covering and uncovering opening 36 has been illustrated, it is to be understood that the present invention is not limited to that particular configuration. Moreover, the present invention is not limited to the particular cartridge or player illustrated. In this regard, many of the components making up the cartridge and player have not been described or have only been described briefly since they are not necessary to the present invention. These particular components could be readily provided by those with ordinary skill in the art.

What is claimed is:

1. In an information storage and retrieval system including a cartridge containing means in the form of a magnetic disc for storing information within a closed housing, the housing including a cover slidably movable between an opened position and closed position, and an apparatus for retrieving information from said storing means when the cartridge and apparatus are combined in a predetermined way with said cover in its opened position, the improvement comprising:
   (a) means including a guide pin and track forming part of said cover and said apparatus respectively for automatically causing said cover to slide open from its closed position in order to gain access to said information storing means by said apparatus when said cartridge and apparatus are combined and for automatically causing said cover to slide closed when the cartridge is separated from said apparatus.

2. A system for storing and retrieving certain information on a magnetic disk, comprising:
   (a) a cartridge assembly including
      (i) a magnetic disc for storing said information,
      (ii) a cartridge housing having an inner compartment including said disc, said housing also having an opening into said compartment for gaining access to said disc by cooperating information retrieving apparatus, and
      (iii) cover means connected with said housing for slidable movement along an outer section of said housing between a first position for covering said opening in order to protect the disc from dust and other elements in the ambient surroundings and a second position for uncovering said opening and thereby allowing said apparatus to gain access to said disc;
   (b) an information retrieving apparatus including
      (i) means connectable with said disc for retrieving the information stored thereby,
      (ii) an apparatus support structure having a receiving chamber containing said information retrieving means and configured to receive said cartridge assembly for connecting with said retrieving means with said disc through the opening in said cartridge housing; and
   (c) part of said apparatus for causing said cover means to slide from its first position to its second position as said assembly is placed into said receiving station and for causing said cover means to slide from its second position to its first position as said assembly is removed from said station, said means for causing said cover means to slide between the first and second positions including engaging surfaces on said covering means and the support structure of said apparatus, said engaging surfaces including a guide pin connected with and carried by said covering means and a track in a surface defined by said support structure for receiving said pin.

3. A system according to claim 2 wherein said pin is received by said track when said cartridge assembly is placed in said receiving apparatus in a specific way and wherein said engaging surfaces includes a second guide pin connected with and carried by said covering means and a second track in said surface defined by said support structure for receiving said second pin for causing said cover means to move between its first and second position when said cartridge assembly is placed in said receiving apparatus in a second specific way.

4. A system according to claim 3 wherein said first mentioned and second tracks extend out along straight-line paths and angles away from one another and then along straight-line sections parallel to one another.

5. In a system for storing and retrieving certain information on a magnetic disc, which system includes an information retrieving apparatus defining track members, an information containing cartridge assembly, comprising:
   (a) means including said magnetic disc for storing retrievable information on said disc;
   (b) a cartridge housing having a top side and bottom side joined together by opposing from and back walls and opposing side walls, all of which together define an inner compartment containing said information storing means;
   (c) an opening in said housing for gaining access to said information storing means within said compartment by said information retrieving apparatus, said opening extending along a front section of said front wall and rearwardly therefrom along said top and and bottom sides towards but stopping short of said back wall;
   (d) a generally U-shaped cover disposed around an outer segment of said cartridge housing over portions of its front wall and top and bottom sides and connected therewith for slidable movement between a first position for covering said opening in order to protect the information storing means from dust and other elements in the ambient surroundings and a second position for uncovering said opening and thereby allowing said apparatus to gain access to said storing means; and
   (e) a pair of guide pins connected with and extending outwardly from sections of said cover disposed in confronting relationship with the top and bottom sides of said cassette housing, said guide pins being respectively adapted to be engaged by said track members of said information retrieving apparatus in a way which causes the cover to automatically move between its first and second positions whether the cartridge assembly is positioned in a particular way with respect to the retrieving apparatus or inverted 180°.

* * * * *